(12) United States Patent
Benthien

(10) Patent No.: US 7,775,479 B2
(45) Date of Patent: Aug. 17, 2010

(54) LINING FRAMEWORK FOR AN AIRCRAFT

(75) Inventor: Herrmann Benthien, Sottrum (DE)

(73) Assignee: Airbus Deutschland GmbH, Hamburg (DE)

( * ) Notice: Subject to any disclaimer, the term of this patent is extended or adjusted under 35 U.S.C. 154(b) by 270 days.

(21) Appl. No.: 12/009,625

(22) Filed: Jan. 18, 2008

(65) Prior Publication Data

US 2008/0173756 A1 Jul. 24, 2008

Related U.S. Application Data

(60) Provisional application No. 60/881,640, filed on Jan. 22, 2007.

(30) Foreign Application Priority Data

Mar. 9, 2007 (DE) ........................ 10 2007 011 620

(51) Int. Cl.
B64D 25/00 (2006.01)

(52) U.S. Cl. ................. 244/122 R; 244/118.6; 297/452.63; 297/216.17; 5/9.1

(58) Field of Classification Search ............. 244/122 R, 244/118.6; 297/452.63, 216.17, 14, 331, 297/273, 248; 5/9.1
See application file for complete search history.

(56) References Cited

U.S. PATENT DOCUMENTS

| | | | |
|---|---|---|---|
| 571,042 A | 11/1896 | Edquist | |
| 2,556,076 A | * 6/1951 | Evans et al. | ...................... 5/9.1 |
| 2,556,077 A | * 6/1951 | Fetterly et al. | ................... 5/9.1 |
| 2,700,412 A | * 1/1955 | Evans et al. | .................. 297/232 |
| 2,758,365 A | 8/1956 | Ricefield | |
| 2,789,457 A | 4/1957 | Allen | |
| 2,920,672 A | 1/1960 | Bronson | |

| | | |
|---|---|---|
| 3,208,496 A | 9/1965 | Phelan |

(Continued)

FOREIGN PATENT DOCUMENTS

FR 1234984 8/2002

(Continued)

OTHER PUBLICATIONS

International Search Report for PCT/EP/2008/050292 dated May 19, 2008.

(Continued)

*Primary Examiner*—Christopher P Ellis
(74) *Attorney, Agent, or Firm*—Jenkins, Wilson, Taylor & Hunt, P.A.

(57) ABSTRACT

Disclosed is a lining framework for fastening seats in an aircraft. The lining framework preferably comprises three seat rails, which are arranged in a spaced apart manner parallel to each other along both side walls of the fuselage cell. Sitting surfaces of a plurality of seats are suspended on the seat rails by textile straps consisting of high-strength, woven plastic material. At least two straps are arranged between the upper seat rail and two frames of the fuselage cell of the aircraft. In this case, a strap length is measured so that forces from the fuselage cell cannot be transmitted into the lining framework. By the same token, however, forces from the lining framework can be introduced into the fuselage cell by means of the straps so that the lining framework can be designed statically lighter. This leads to a weight reduction of the lining framework.

3 Claims, 2 Drawing Sheets

U.S. PATENT DOCUMENTS

| | | | | |
|---|---|---|---|---|
| 3,314,720 | A * | 4/1967 | Millington et al. | 297/216.1 |
| 3,868,143 | A * | 2/1975 | Reilly | 297/216.17 |
| 4,005,765 | A * | 2/1977 | Reilly | 188/372 |
| 5,180,263 | A | 1/1993 | Flowers, Jr. | |
| 6,394,393 | B1 * | 5/2002 | Mort | 244/122 R |
| 6,663,314 | B2 | 12/2003 | Bequet | |
| 6,889,939 | B2 | 5/2005 | Rouyre et al. | |
| 7,462,006 | B2 | 12/2008 | Benthien | |
| 7,594,701 | B2 * | 9/2009 | Kawabata et al. | 297/452.63 |
| 2006/0011781 | A1 * | 1/2006 | Knoll et al. | 244/122 R |
| 2006/0237586 | A1 * | 10/2006 | Barackman et al. | 244/118.6 |

FOREIGN PATENT DOCUMENTS

| | | |
|---|---|---|
| FR | 1342927 | 9/2003 |
| FR | 2883939 | 10/2006 |
| GB | 2026623 | 2/1980 |

OTHER PUBLICATIONS

Notice of Allowance for U.S. Appl. No. 12/009,150 dated Sep. 30, 2008.

* cited by examiner

US 7,775,479 B2

LINING FRAMEWORK FOR AN AIRCRAFT

CROSS-REFERENCE TO RELATED APPLICATIONS

This application claims the benefit of U.S. Provisional Application No. 60/881,640, filed Jan. 22, 2007 and German patent application No. 10 2007 011 620.0, filed Mar. 9, 2007, the entire disclosures of which are herein incorporated by reference.

FIELD OF THE INVENTION

The invention relates to a lining framework for an aircraft, wherein the lining framework comprises at least three seat rails which are connected by a plurality of vertical struts to a primary fuselage structure of the aircraft, especially to frames, and a plurality of seats and/or lying surfaces are arranged on the lining framework.

Known embodiments of lining frameworks have a plurality of seat rails which extend parallel to the longitudinal axis of the aircraft. The seat rails extend on the inner side of the fuselage cell in the region of the side walls. The standardized seat rails have a basically C-shaped cross-sectional geometry and allow the positionally variable fastening of seats, stretchers, beds or suchlike in fixed preset spacings for example of one inch.

Unlike normal passenger aircraft, no fixed seats are used in the case of military applications, but downwards foldable sitting surfaces, which are suspended by straps on the seat rails, are used when required. Furthermore, the seat rows are not arranged transversely to the longitudinal axis of the aircraft as is customary in passenger aircraft. In the case of aircraft for military applications, the seats are arranged next to each other in two long seat rows in each case along the two outer walls of the fuselage cell, and the passengers are seated in the two parallel seat rows, that is opposite each other. The side guiding of the sitting passengers is carried out by means of the straps, and flexible nets, which are arranged on both sides of the sitting area, serve for side support of the head in the direction of flight.

The suspension of the seats themselves on the lining framework is carried out by means of suitable straps, bands, ropes or suchlike, wherein the lining framework is connected by a plurality of further structural elements, for example in the form of vertical struts, cross-struts or suchlike, to the primary structure of the aircraft. As a result of this special arrangement of the two seat rows in military applications, still adequate space for the transporting of vehicles, freight containers or other bulky goods remains in the centre section of the fuselage cell of the aircraft, even when transporting passengers.

So as not to introduce loads which originate from the seats and/or beds during flight operations directly into the primary structure, that is to say to achieve a load decoupling as a result, the lining framework is provided which represents a secondary structure in relation to the primary structure of the fuselage cell. The loads which originate from the seats and/or from the beds in all operating states are introduced into the three seat rails of the lining framework. These seat rails are supported within a spacing of three frames as a rule, that is to say 1.524 m, again by vertical struts consisting of aluminium. On account of this large bearing spacing, severe deformations of the seat rails can occur in dependence upon the flight situation of the aircraft.

The known lining frameworks, therefore, in order to be able to safely control all conceivable load cases, and especially crash situations during flight operations, must be dimensioned with mechanically adequate load bearing effect, as a result of which the weight is naturally increased.

SUMMARY OF THE INVENTION

One of the objects of the invention is to create a lining framework, the weight of which in comparison to previously known arrangements for seat fastening in aircrafts is significantly reduced, and yet which is able to absorb all loads which occur during flight operations.

Accordingly, a lining framework for an aircraft is provided that comprises: at least three seat rails, including an upper seat rail; and a plurality of vertical supports connecting the seat rails to a fuselage cell of the aircraft; wherein a plurality of seats and/or lying surfaces are arranged on the lining framework, and wherein a plurality of straps are arranged between the upper seat rail and the fuselage cell.

The vertical struts of the lining framework can especially be designed for a lower mechanical load, due to the fact that a plurality of straps are arranged between an upper seat rail and the fuselage cell, especially between the upper seat rail and the frames, wherein a strap length is measured in such a way that the straps in the case of a deformation of the fuselage cell are subjected to mechanical loads only when loads are no longer introduced into the lining framework following the deformation of the fuselage cell. By means of this, a weight reduction is possible in comparison to previously known embodiments of lining frameworks. Furthermore, the connection according to the invention of the lining framework to the fuselage structure by means of high-strength straps allows a decoupling between the primary structure (fuselage cell) and the secondary structure (lining framework) of the aircraft. By means of this, an important design criterion is met, whereupon mechanical loads are indeed permitted to be introduced from the secondary structure into the primary structure, but not vice versa. On no account, during all conceivable flight situation-dependent deformations of the primary structure, may a load introduction into the secondary structure occur.

BRIEF DESCRIPTION OF THE DRAWINGS

In the figures, the same constructional elements are denoted by the same reference numerals.

DETAILED DESCRIPTION OF THE INVENTION

Figure 1:
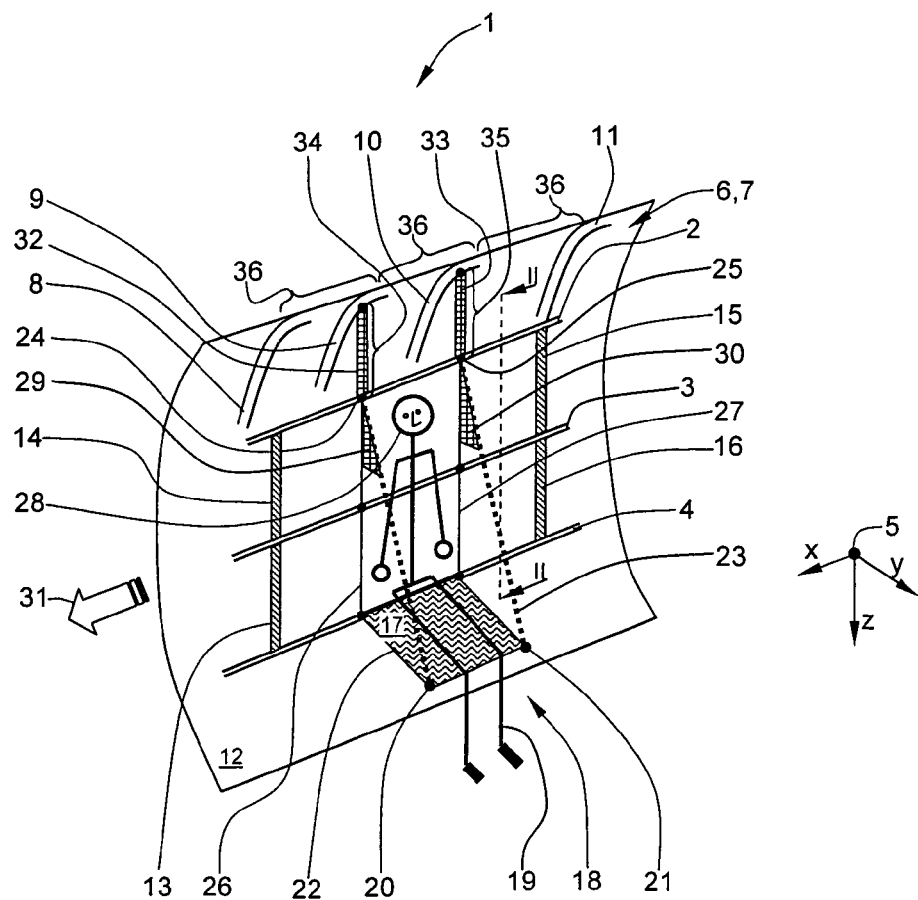
FIG. 1 shows a much schematized perspective view of the lining framework with a seat which is suspended upon it.

FIG. 1 shows a much schematized perspective view of the lining framework with a seat which is suspended upon it.

A lining framework 1 comprises inter alia an upper seat rail 2, a centre seat rail 3 and also a lower seat rail 4. The seat rails 2 to 4 are standard aluminium profiles with a basically C-shaped cross-sectional geometry which are commonly used in the field of air travel. The seat rails 2 to 4 allow the attachment of fastening elements in fixed preset spacings for example of one "inch". The seat rails 2 to 4 preferably extend in each case on both sides over the entire longitudinal extent of the fuselage cell of the aircraft.

All spatial directions are illustrated by means of a coordinate system 5 with an x-axis, a y-axis and a z-axis. The seat rails 2 to 4 extend parallel to the x-axis, that is to say parallel to a longitudinal axis of the aircraft, which is not drawn in, and consequently in the direction of flight of the aircraft. The z-axis of the coordinate system 5 points downwards, that is to say in the direction of the ground over which the aircraft moves. The seat rails 2 to 4, which extend in parallel, are arranged in the lining framework 1 in a displaced manner, one above the other, in the direction of the z-axis. The y-axis of the coordinate system 5 points from a right-hand side wall 6 of a fuselage cell 7, as seen in the direction of flight, into the interior space. The fuselage cell 7 is formed in a known way inter alia by frames 8 to 11, which are externally panelled with a fuselage cell skin 12 to form the side wall 6.

In the region of the frame 8 and of the frame 11, four vertical supports 13 to 16 are arranged for connecting the seat rails 2 to 4 to the fuselage cell 7, that is to say to the primary structure of the aircraft, as a result of which the lattice-like structure of the lining framework 1 is formed. The vertical supports 13 and 14, and also 15 and 16, can also be formed continuously in each case, that is to say formed in one piece. Owing to the circumstance that vertical supports are provided only after each fourth frame, a large bearing distance of the seat rails 2 to 4 results, which leads to considerable bowing of the seat rails 2 to 4 and to a correspondingly high loading of the vertical supports 13 to 16. In particular, there is the risk of buckling on the part of the vertical supports in critical flight situations. The regions between the vertical supports 13 to 16 and the seat rails 2 to 4 are filled in each case with thin-walled "lining" panels which have only a sound-proofing function for the passenger 19 and cannot absorb relevant mechanical loads.

A folded-down sitting surface 17 of a seat 18 is occupied by a passenger 19. The sitting surface 17 is movably connected in a rear region to the lower seat rail 4. In a front region of the sitting surface 17, two connecting elements 20, 21 are located. The "suspension" of the sitting surface 17 is preferably carried out by two flexible straps 22, 23 which lead from the connecting elements 20, 21 to two further connecting elements 24, 25 which are fastened to the upper seat rail 2.

The connecting elements 24, 25, for example, can be annular eyes which can be connected by means of a suitable standardized latch-clamp connection to the respective seat rail 2 to 4. The connecting elements 20, 21 on the other hand are rigidly connected to the sitting surface 17. The straps 22, 23, for example in a loop, are guided through the eyes of the connecting elements 20, 21 and also 24, 25, and suitably fastened, for example by means of splicing. The straps 22, 23 are preferably formed by a suitable, mechanically high-strength, woven textile plastic material. Instead of the straps 22, 23, ropes or bands, which are formed by a comparably loadable material, can also be used.

When not in use, the sitting surface 17 is folded up, that is to say brought into a vertical position parallel to the z-axis. All further connecting elements in the view of FIG. 1, as the connecting elements 20, 21, 24, 25, are represented by small black-filled circles which for the sake of improved overview are not provided with a designation.

Two further straps 26, 27, which are connected in turn by means of a plurality of connecting elements in each case to the seat rails 2 to 4, are arranged on both sides of the seat 18. The straps 26, 27 can be formed continuously or can be fastened in each case in sections between the seat rails 2 to 4. The straps 26, 27 form a side boundary of the seat 18. A further, correspondingly constructed seat (not shown) is suspended in each case on the lining framework 1 on both sides of the seat 18. Instead of three seats, a bed or a stretcher can alternatively be suspended.

Two basically triangular nets 29, 30 are suspended on both sides in the region of a head 28 of the passenger 19, which serve for side guiding of the head 28, especially in a crash situation. In such a crash situation, mechanical forces of several g can occur in the direction of the x-axis (direction of flight). The direction of flight is additionally indicated in the view of FIG. 1 by a large arrow 31 for illustration. The nets 29, 30 are likewise formed by a mechanically high-strength, elastic plastic material.

According to the invention, two further straps 32, 33 are arranged between the upper seat rail 2 and in the region of the frames 9, 10.

A strap length 34, 35 of the straps 32, 33 in this case is dimensioned so that the straps 32, 33 only take effect when the deformations of the fuselage cell 7 can no longer create an appreciable "co-supporting", that is to say that as a result no "supporting" of the fuselage 7 (primary structure) on the lining framework 1 is carried out. In the case of deformations of the fuselage cell 7, for example in extreme flight situations, the straps 32, 33 are relieved of tension as a result of relaxation, so that a "one-sided" mechanical decoupling between the primary structure, in the form of the fuselage cell 7, and the secondary structure, in the shape of the lining framework 1, is provided. The straps 32, 33 take effect only when the deformations of the fuselage cell 7 do not cause "co-supporting" of the lining framework 1. By means of this, it is ensured under all conceivable flight situations that relevant load introduction from the primary structure into the secondary structure does not take place. The reverse case, in which a load flow from the lining framework 1 into the fuselage cell 7 takes place, is on the other hand possible.

The calculation of the strap length 34, 35 in this case must be carried out individually for each seat 18. Consequently, the strap length 34, 35 of the straps 32, 33 must be checked at least during the production process, and, moreover, must be very accurately adjustable. If applicable, it can be necessary to design the connecting elements which are required for connection of the straps 32, 33 so that a subsequent length adjustability of the straps 32, 33 is provided so that a length correction is still possible in the course of maintenance and service operations.

The straps 32, 33 enable the lining framework 1, and especially the vertical supports 13 to 16 and also the seat rails 2 to 4, to be mechanically less stably designed, that is designed "lighter", on account of the mechanical supporting action of the straps 32, 33, so that a significant weight saving results in comparison to previously known constructional forms of lining frameworks. The straps 32, 33 are preferably formed by a mechanically highly loadable, woven plastic material, for example an ultra-high molecular weight polyethylene, such as Dynema®, which has a width of between 1 cm and 5 cm with a material thickness of up to 5 mm. Alternatively, ropes or bands consisting of this material can also be used.

The lining framework 1 which is shown in FIG. 1 continues parallel to the x-axis over the entire length of the fuselage cell 7 on both side walls of the aircraft. This means that a plurality of straps, the design of which corresponds in each case to the structure of the straps 32, 33, is arranged between the upper seat rail 2 and the frames. At least two straps are preferably provided in each case in the region of three frame spacings 36. The frame spacing 36 in the fuselage cell 7 is preferably identical in each case, and is in particular 508 mm. Measurements which deviate from the specified values can be advantageous if the occasion should arise. Such seat arrangements are commonly used in military aircraft, especially in military transport aircraft in order to keep free the centre aisle in the fuselage cell 7 for loading with bulky goods, such as vehicles, pallets or containers.

Figure 2:
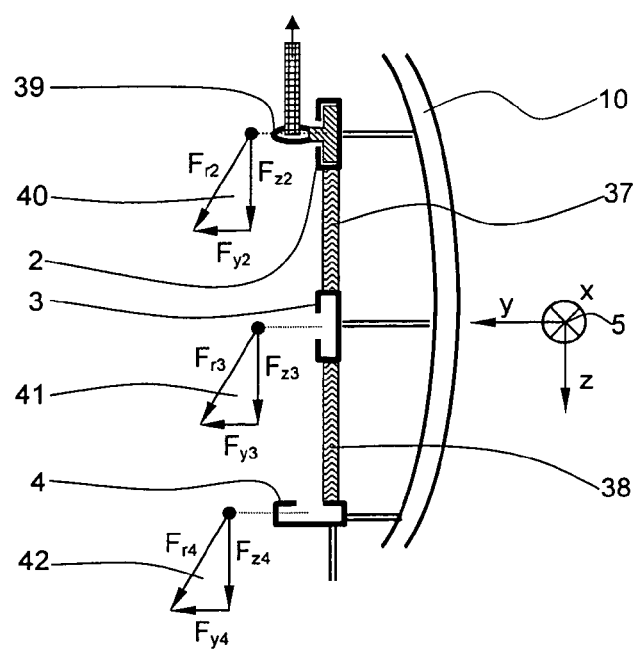
FIG. 2 shows a schematized cross-sectional view of FIG. 1 with the forces which essentially act upon the lining framework.

FIG. 2 shows a cross-sectional view in the region of the line of intersection II-II of FIG. 1, with the forces which essentially act upon the lining framework.

In the region of the frame 10, the seat rails 2 to 4 are fastened by means of struts or suchlike, which are not described in more detail. The coordinate system 5 illustrates the position in the space. In the seat rails 2 to 4, the connecting elements (cf. FIG. 1) can preferably be fastened in preset spacings of one "inch". Lining panels 37, 38 are arranged between the seat rails 2 and 3 and also in the region between the seat rails 3 and 4. The strap 27 for seat fastening (cf. FIG. 1) is not shown for the sake of improved overview. The lining panels 37, 38 have only a sound-proofing function, that is they cannot absorb loads to an appreciable extent. A fixable eye 39, as an exemplary embodiment for a connecting element for the strap 33, is shown in the upper seat rail 2. The strap 33 continues upwards until the connecting element for fastening on the frame 10 is reached (not shown). Three parallelograms of forces 40 to 42 illustrate the forces $F_{y2-4}$ and $F_{z2-4}$ which basically act upon the seat rails 2 to 4 along the y-axis and the z-axis respectively, and also the resultants $F_{r2-4}$ in each case.

Figure 3:
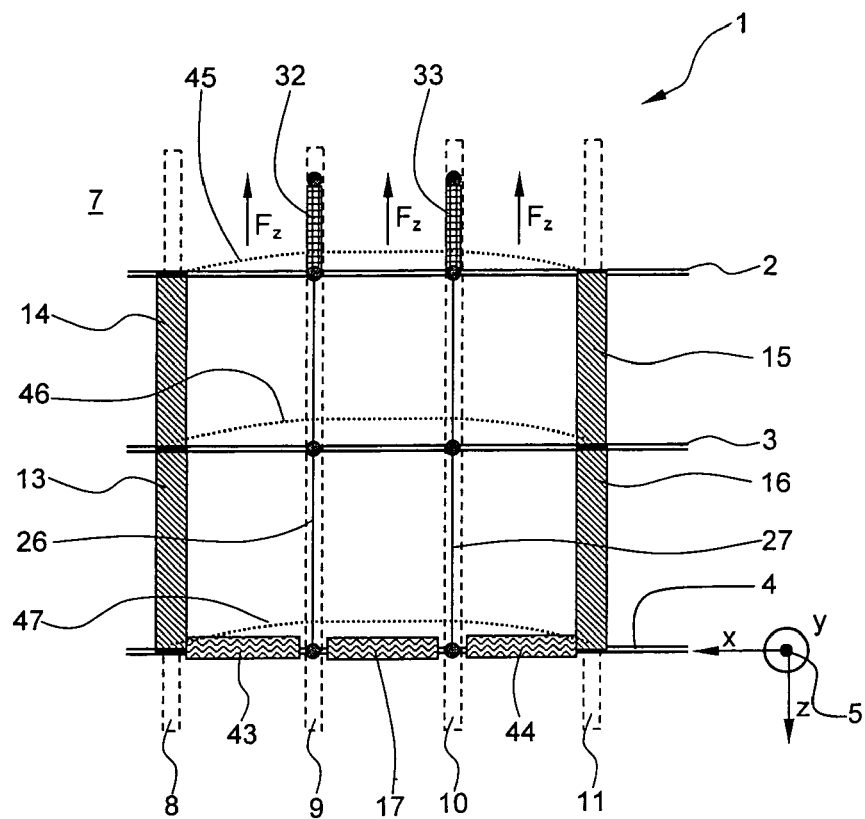
FIG. 3 shows a schematized plan view of the lining framework.

FIG. 3 shows a plan view of the lining framework as seen from the interior space of the fuselage cell. The connecting elements for connecting the straps to the fuselage cell are symbolically represented by small black-filled circles without separate designations. The straps 26, 27 support the sitting surface 17 or support the seat 18. Two further sitting surfaces 43, 44 are arranged on both sides of the sitting surface 17.

The seat rails 2 to 4 are supported by means of the vertical supports 13 to 16. The entire lining framework 1 is connected to the fuselage cell 7 or to the frames 8 to 11 by means of structural elements which are not represented in more detail. The entire lining framework 1 is basically loaded by the mechanical forces $F_z$, which act in each case in the opposite direction to the z-axis of the coordinate system 5. The forces $F_z$ are created inter alia in the case when the sitting surfaces 17, 43, 44 are occupied by passengers with full equipment.

According to the invention, at least the upper seat rail 2 is fastened by the straps 32, 33 via the connecting elements to the centre frames 9 and 10. Preferably at least two straps 32, 33 are always arranged in each case in the region between two vertical supports 13 to 16 in each case. A number and arrangement of straps which deviates from this is equally possible. The arrangement which is shown in FIG. 3 continues on both sides over the entire length of the fuselage cell 7. The three dash-dotted lines represent the lines of deflection 45 to 47 of the seat rails 2 to 4 which are created as a result of the influence of the forces $F_z$. The bowing of the seat rails 2 to 4 as a result of the forces $F_z$ is approximately always as great as the largest deformation of the fuselage cell 7 before the straps 32, 33 take effect, that is to say before they are loaded.

Figure 4:
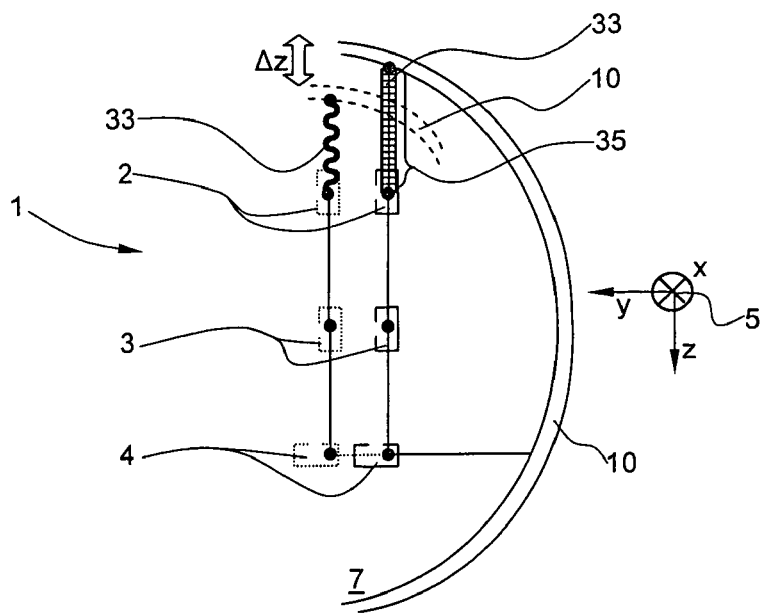
FIG. 4 shows a view of the operating principle of the strap suspension for load decoupling.

FIG. 4 schematically illustrates the operating method of the straps which are used for supporting the upper seat rail of the lining framework.

The coordinate system 5 illustrates the position of the lining framework 1 in the space. In the undeformed state ("initial state") of the fuselage cell 7, the frame 10 has the cross-sectional contour which is represented by a continuous double line. In this state, the strap 33 can transmit tensile forces, which for example are produced by a sitting person, to the frame 10. By means of this, an unloading of the lining framework 1 takes place, which framework can consequently be dimensioned with more of a weight-saving effect.

In a deformed state ("operating state") of the fuselage cell 7, which for example occurs in flight operations, the frame 10 has a cross-sectional contour which corresponds to the run of the dashed double line. The associated degree of deformation is symbolized by the black double arrow with the deformation path "$\Delta z$". In this case, the strap 33 relaxes, as indicated by the thick serpentine line, so that the primary structure in the form of the frame 10 cannot "bear" upon the lining framework 1 in the function as secondary structure. The seat rails 2 to 4 have an unchanged position, since the loads which act upon them in both states are essentially equal.

Mechanical forces, on account of the flexible properties of the strap 33 and the suitable design of the strap length 35, cannot cross over from the primary structure into the secondary structure. Therefore, a mechanical unloading of the lining framework 1, especially of the vertical supports 13 to 16 and of the seat rails 2 to 4, is possible, since only tensile forces, which by means of the strap 33 are transmitted into the frame 10 and consequently onto the primary structure, essentially originate from the lining framework 1. However, if a deformation of the fuselage cell 7 occurs during flight operations by the amount $\Delta z$, the reverse force flow is excluded, since by means of the strap 33 only tensile forces, but no compressive forces, can be transmitted. Alternatively, forces could be transmitted from the primary structure into the lining framework 1, which is not permissible for reasons of flight safety technology. The length changes $\Delta z$ in all flight situations which occur in practice as a rule amount to less than 1 mm.

What is claimed is:

1. An aircraft comprising a lining framework, the lining framework comprising:
    at least three seat rails, including a lower seat rail and an upper seat rail, the lower and upper seat rails extending horizontally; and
    at least two supports extending vertically and connecting the lower and upper seat rails to a fuselage cell of the aircraft, the supports being spaced apart horizontally; and
    at least one seat connected to the lower and upper seat rails;
    wherein at least two straps connect the upper seat rail to frames of the aircraft, the straps being configured to only transmit tensile forces in a vertical direction.

2. The aircraft according to claim 1, wherein the straps are formed by a band-form fabric with a mechanically high-strength plastic material.

3. The aircraft according to claim 2, wherein the straps are made of an ultra-high molecular weight polyethylene.

* * * * *